(12) United States Patent
Schliwa-Bertling et al.

(10) Patent No.: US 8,081,644 B2
(45) Date of Patent: Dec. 20, 2011

(54) METHOD AND DEVICE FOR CONTROLLING A QUEUE BUFFER

(75) Inventors: Paul Schliwa-Bertling, Ljungsbro (SE); Hannes Ekström, Stockholm (SE); Reiner Ludwig, Hürtgenwald (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 637 days.

(21) Appl. No.: 10/596,782

(22) PCT Filed: Dec. 23, 2003

(86) PCT No.: PCT/EP03/14788
§ 371 (c)(1),
(2), (4) Date: Mar. 31, 2007

(87) PCT Pub. No.: WO2005/064861
PCT Pub. Date: Jul. 14, 2005

(65) Prior Publication Data
US 2007/0286070 A1    Dec. 13, 2007

(51) Int. Cl.
*H04L 12/28* (2006.01)
(52) U.S. Cl. ........................................ 370/412; 714/748
(58) Field of Classification Search ............... 370/229, 370/412, 235; 714/748
See application file for complete search history.

(56) References Cited

U.S. PATENT DOCUMENTS

| | | | |
|---|---|---|---|
| 6,657,954 B1 * | 12/2003 | Bird et al. | 370/229 |
| 7,272,111 B2 * | 9/2007 | Zukerman et al. | 370/230 |
| 2002/0145976 A1 * | 10/2002 | Meyer et al. | 370/235 |
| 2004/0062259 A1 * | 4/2004 | Jeffries et al. | 370/412 |

FOREIGN PATENT DOCUMENTS
EP    1249972 A    10/2002
* cited by examiner

*Primary Examiner* — Dang Ton
*Assistant Examiner* — Wei Zhao (57) ABSTRACT

A method and device of controlling a queue buffer, in which a congestion notification procedure is conducted if a queue length parameter exceeds a threshold value, said threshold value being adapted automatically by a procedure that takes into account a flow control parameter.

12 Claims, 4 Drawing Sheets

METHOD AND DEVICE FOR CONTROLLING A QUEUE BUFFER

FIELD OF THE INVENTION

The present invention relates to a method and device for controlling a queue buffer, where said queue buffer is connected to a link and queues data unit of a flow in a queue.

BACKGROUND OF THE INVENTION

In data unit based communication, i.e. in which an information to be transmitted is divided into a plurality of units, and the individual units are sent over a communication network, it is known to provide queue buffers at links along the network, such that data units transported over such a link may be buffered. The buffer may be a sending or output buffer (i.e. a buffer for data units that are to be sent over the outgoing link) or a receiving or input buffer (i.e. a buffer for data units that have been sent over the incoming link).

Such units for transporting data may carry a variety of names, such as protocol data units, frames, packets, segments, cells, etc., depending on the specific context, the specific protocol used and certain other conventions. In the context of the present document, all such units of data shall generically be referred to as data units.

The procedures for placing data units into a queue, advancing them in the queue, and removing data units from the queue are referred to as queue management or queue control.

Many concepts of queue management are known, including such concepts in which a queue length parameter (e.g. the absolute length of queue or an average length) is monitored and compared with a length threshold value, in order to perform a congestion notification procedure if the threshold value is exceeded. Such a congestion notification procedure can consist in dropping a data unit and/or in marking data units (e.g. setting a congestion notification flag in data units). Various examples for such management concepts, like drop-on-full or random early detection (RED) are described in the introduction of EP-A-1 249 972. As a consequence, a repetition is not necessary here.

EP-A-1 249 972 proposes a scheme in which the length threshold value that is to be compared with the queue length parameter is automatically updated on the basis of one or more characteristics of the link over which the queued data units are to be sent. By adapting the automatic threshold to one or more link characteristics, a very flexible form of active queue management is obtained that may provide improved throughput and reduced delay, especially over links that have time varying characteristics such as wireless links.

OBJECT OF THE INVENTION

It is the object of the present invention to provide an improved method and device of queue buffer management.

SUMMARY OF THE INVENTION

This object is achieved by a method and device as described in the independent claims of the present application. Advantageous embodiments are described in the dependent claims.

In accordance with the present invention, in a system where queue buffer control or management comprises determining a value of a length parameter related to the queue length, comparing this value with a threshold and performing a congestion notification procedure if the threshold is exceeded, and in which an automatic threshold adaptation procedure is provided that comprises a procedure for adjusting the length threshold value on the basis of one or more flow control parameters.

By taking into account one or more flow control parameters associated with a queued data unit flow, the queue buffer management becomes more flexible and is better able to act in such a way that the impact of buffer management actions or decisions on the flow control does not produce undesired effects, and/or better able to react to the flow control in a more direct and intelligent way than in prior art systems.

The one or more flow control parameters can be determined in any suitable or desirable way. As an example, they can be predetermined values stored in the buffer controller. Preferably, they are in this case associated with known flow control procedures for data unit receivers. In other words, if it is known that certain flow control procedures (e.g. as given by widely used computer programs that comprise flow control routines) use predetermined flow control parameters, then these known flow control parameters can be employed as a basis for adjusting the length threshold value.

As an alternative or in addition to deriving at least some of the one or more flow control parameters on the basis of predetermined values, a procedure may be provided for determining at least some of said one or more flow control parameters from a flow control parameter introduced by one of a sender and a receiver of said flow queued in said queue.

The buffer management can be tuned in any way that is desirable with respect to the given network context, flow control principle and the desired effects (or the negative effect that it is desired to avoid). According to a preferred embodiment, the adaptation of the queue buffer management to a determined flow control parameter is used to avoid a link under-utilization. Link under-utilization means that there are periods in which the link is idle (i.e. not transporting data units). More specifically, in this preferred embodiment it is checked whether a desired length threshold value could lead to congestion notification operations that in turn could potentially provoke link under-utilization due to the reaction of the sender that sends data units, and the length threshold value is adapted differently in order to avoid this link under-utilization. As a result, network resources are used more efficiently.

BRIEF DESCRIPTION OF DRAWINGS

Further aspects and details of the present invention will become apparent from the following detailed description of preferred embodiments, where reference will be made to the accompanying figures in which.

DETAILED DESCRIPTION OF THE EMBODIMENTS

Although the following preferred embodiments of the present invention will often refer to systems using window-based flow control, and more specifically to systems transporting IP (Internet Protocol) data units, the present invention is neither restricted to window-based flow control nor to IP based systems. The present invention can be applied to the queuing of any type of data unit, regardless of the specific protocol, and can be applied to any type of flow control, e.g. also to rate-based flow control, as long as it is possible for the buffer management procedure to determine a flow control parameter.

Furthermore, the method of the present invention may be applied to any known queue management scheme in which a queue length related parameter is compared to at least one length threshold value, and where a congestion notification procedure is conducted if the threshold is exceeded. Namely, the method is e.g. applicable to any known RED scheme, to schemes that drop data units when a queue is full, such as tail-drop, random-drop or front-drop, and to any known scheme that perform explicit congestion notification instead of or in addition to dropping.

It is preferable to apply the method and device of the present invention in connection with the active queue management disclosed in EP-A-1 249 972. The entire disclosure of this document and its US counter-part application, are herewith incorporated by reference.

Figure 1:
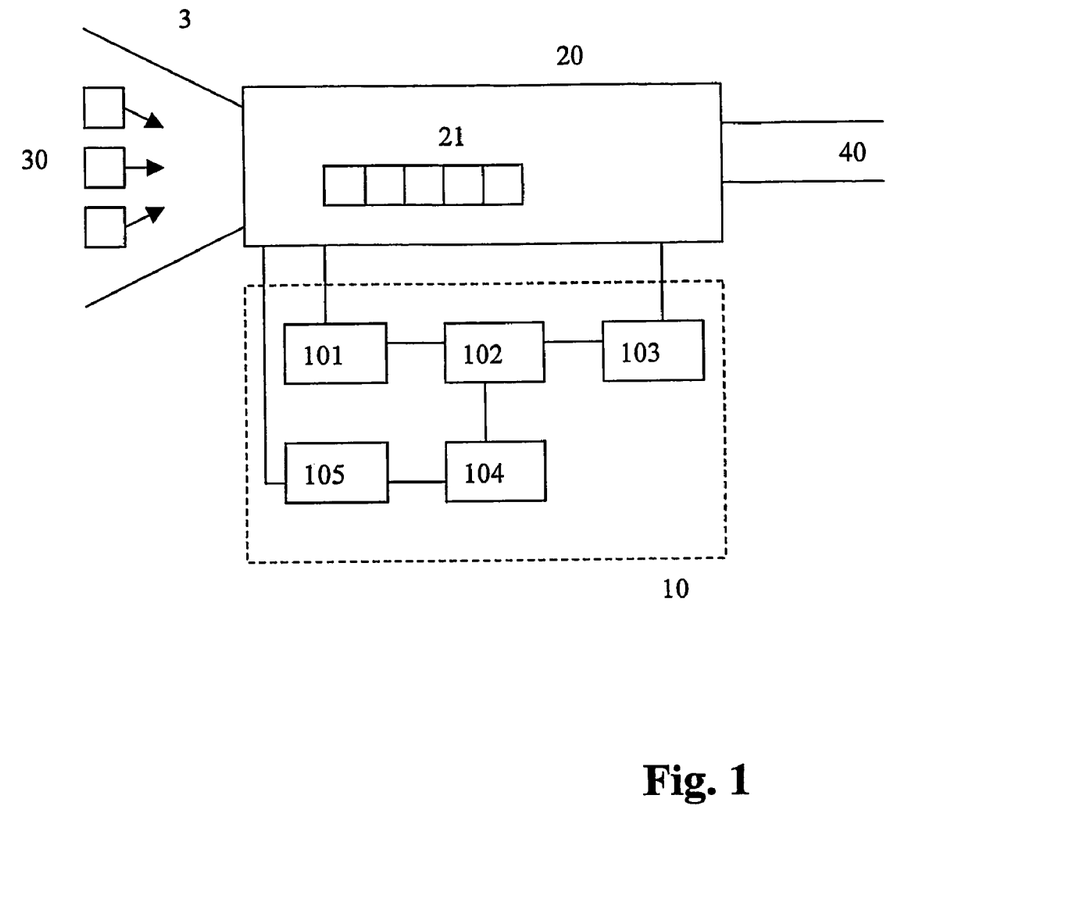
FIG. 1 shows a schematic block diagram representation of a buffer and buffer controller according to an embodiment of the invention.

FIG. 1 shows a schematic representation of a queue buffer controller 10 that is capable of implementing the present invention for controlling the management of data units in a queue buffer 20. Reference numeral 3 represents a communication network over which data units 30 arrive at the queue buffer 20, in order to be placed in a queue 21 before being sent over link 40.

The data units 30 queued in queue 21 will belong to one or more flows. A flow is generically identified by a source and destination host address, the source and destination Service Access Point (SAP identifier and a protocol identifier. The definition and concept of a flow is well known in the art, e.g. from TCP/IP, in which case the SAP identifiers are referred to as port numbers, and the source and destination host addresses are called IP addresses, such that a further explanation is not necessary here.

Queue 21 can be arranged in such a way that all of the data units in said queue 21 are from the same flow, or they may be from a plurality of flows. It is possible that buffer 20 is managed in such a way that there are a plurality of queues, each queue being associated with a corresponding flow.

Now specific elements will be described for embodying the concept of the present invention in queue buffer controller 10. It is noted that a queue buffer controller will generally comprise more than these elements, namely known elements for processing received data units and managing the buffer, which are not explicitly described for the sake of simplicity. Also, the controller 10 may have elements for specifically embodying a system as described in EP-A-1 249 972.

Reference numeral 101 describes a queue length determinator for determining a value of a length parameter related to the length of queue 21. Furthermore, a comparator 102 is provided for comparing the determined length value with a length threshold value provided by a threshold adaptor 104, which is arranged to automatically adapt the length threshold values. The comparator 102 is connected to a congestion notifier 103 that performs a congestion notification procedure if the determined length value is greater than the length threshold value. As shall be explained in more detail further on, the length parameter to be determined can be chosen in any suitable or desirable way, e.g. be the absolute length queue length or an average queue length, and the congestion notification procedure can equally be chosen as is suitable or desirable, e.g. be a data unit dropping procedure and/or an explicit data unit marking procedure.

In accordance with this embodiment of the present invention, a flow control parameter determinator 105 is provided for determining a flow control parameter introduced by one of a sender and a receiver of a flow queued in queue 21. Furthermore, the threshold adaptor 104 is arranged in such a way that the length threshold value is adjusted on the basis of the determined flow control parameter.

It is noted that the above-described elements 101-105 can be provided as hardware, software or any suitable combination of hardware and software. Preferably, the controller 10 is a programmable data processor, and the elements 101 to 105 are software elements, e.g. program code parts.

Figure 2:
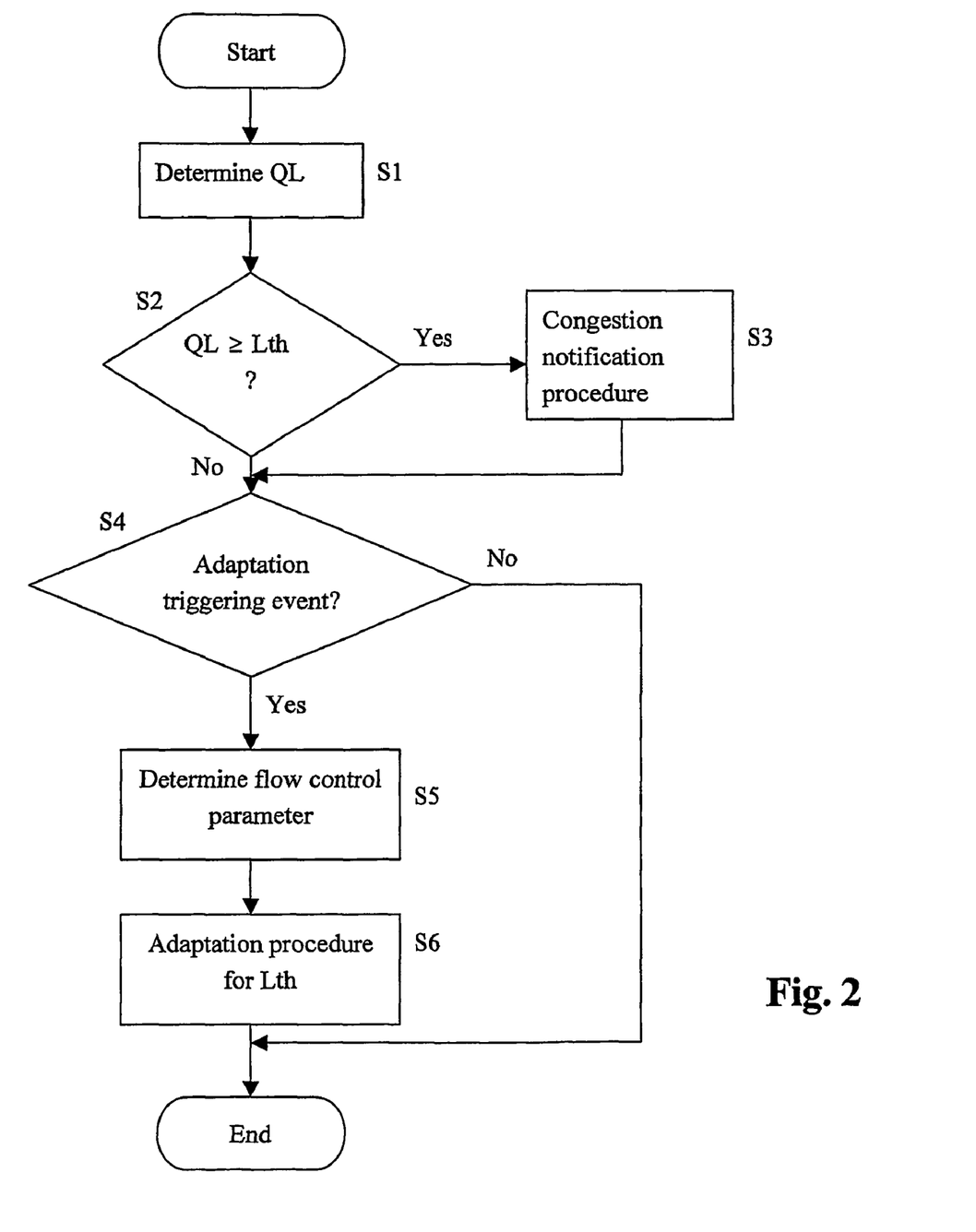
FIG. 2 shows a flow chart of a method embodiment of the present invention.

FIG. 2 shows a flow chart of a method embodiment of the method of the present invention, which method can be performed with the controller 10 shown in FIG. 1. In first step S1, a value of a length parameter related to the length of the queue 21 is determined. This queue length related parameter can be related to the queue length in any desirable or suitable way, e.g. can be the actual or momentary queue length QL or a parameter derived from the actual or momentary queue length, such as an average value $QL_{av}$.

In the example of FIG. 2, the queue length related parameter is the actual queue length QL. If it is desirable to use an average queue length $QL_{av}$, this average value can be determined in accordance with any known suitable averaging algorithm, and such an algorithm may typically consist in updating an old average value by calculating the sum of the old average multiplied by a first weight factor and the momentary queue length multiplied by a second weight factor. For example, QLav can be calculated as $$QL_{av}(\text{new}) = QL_{av}(\text{old}) \cdot (1 - \tfrac{1}{2}^n) + (QL \cdot \tfrac{1}{2}^n)$$

where QL represents the momentary queue length value and n is an exponential weight factor adjustable between 0 and 1.

Returning to FIG. 2, the queue length parameter QL is compared with a length threshold value $L_{th}$. If the length threshold value $L_{th}$ is exceeded, then a congestion notification procedure S3 is performed, otherwise the congestion notification procedure S3 is skipped.

As already mentioned above, the congestion notification procedure can be chosen in any suitable or desirable way. For example, it can consist in dropping/marking one or more predetermined or one or more randomly selected data units from the queue 21, or in dropping/marking one or more newly arrived data units before placing them into queue 21, or performing such a dropping/marking operation in dependence on a predetermined probability function. The marking can e.g. be achieved by setting an explicit congestion notification flag in one or more of the queued data units.

After step S2 or S3, the procedure goes to step S4, in which it is determined whether an adaptation triggering event for adapting the length threshold parameter $L_{th}$ has occurred. It is noted that step S4 is optional. If step S4 decides that an adaptation triggering event has occurred, then the procedure goes to step S5, in which a flow control parameter introduced by one of a sender and a receiver of a flow queued in queue 21 is determined. Then the procedure goes to step S6, where an adaptation procedure for $L_{th}$ is conducted, which adjusts the length threshold value $L_{th}$ on the basis of the flow control parameter determined in step S5.

It may be noted that the specific arrangement of steps shown in FIG. 2 is only an example. Especially, steps S1, S2 and S3, which form a procedure for deciding on the performance of a congestion notification procedure, are independent of the adaptation procedure constituted by steps S4, S4 and S6. Consequently, steps S1, S2 and S3 may be arranged independently of S4, S5 and S6, such that steps S4-S6 can be performed prior to steps S1-S3 or in parallel thereto. Especially, it may be noted that steps S1-S3 on the one hand and steps S4-S6 on the other hand will generally be contained in a larger method of controlling or managing the queue buffer, which larger method has more steps and procedures, but where these additional steps and procedures are not shown, as they do not pertain to the present invention. The method of FIG. 2 may be implemented as software, and the steps S1-S3 can e.g. be implemented in one thread, while S4-S6 may be implemented in another, independent thread. However, the method can also directly be implemented in the form of hardware.

It is noted that the adaptation procedure for $L_{th}$ of step S6 will generally not only take the determined flow control parameter into account, but also other parameters relevant to queue management, such as the link related characteristics suggested by EP-A-1 249 972.

Furthermore, it is noted that the adaptation triggering event in step S4 that leads to the initiation of an automatic threshold adaptation procedure S6 may be chosen as is suitable of desirable. For example, it is possible to initiate the automatic threshold adaptation procedure at regular intervals, such that the adaptation triggering event in step S4 can be a certain time condition becoming true, or the event that a counter reaches a predetermined value. The adaptation triggering event can also consist in a change in one or more parameters that play a role in the adaptation procedure S6, e.g. the measured flow control parameter or one or more link characteristic parameters. It may be noted that in practice a change will only be determined with a certain granularity. In other words, not any ever so small change in a parameter will be considered a triggering event, but much rather only when a change the predetermined magnitude has occurred.

The procedure of determining a flow control parameter may determine one or more flow control parameters involved in the flow control of the flow in question. Preferably, one flow control parameter is monitored and the flow control parameter is preferably introduced by the receiver of the flow. This can e.g. be done by inserting the flow control parameter into acknowledgment data units sent from the receiver to the sender for acknowledging the correct receipt of data units. Schemes of this nature are well known in the art, such as ARQ (Automatic Retransmission reQuest), such that a further explanation is not necessary here.

For example, if the flow control is window-based, then the flow control parameter may be a control window introduced by the receiver, said control window expressing a limitation of how many data units the receiver can handle. For example, the measured flow control parameter can be the receive window or advertised window rwnd known from TCP. However, the measured flow control parameter can also be introduced by the sender and express a limitation of how many data units the sender can send.

On the other hand, in a rate-based flow control system, the measured flow control parameter can be a control rate introduced by the receiver, e.g. which expresses a data rate limitation for arriving data units that the receiver can handle, which can also be referred to as rlfr (Receiver Limitation Flow Rate). On the other hand, one of the flow control parameters could also be a data rate announced by the sender of the flow. 13, e.g. expressing a data rate limitation for the rate of data units that the sender can send, a current sending rate of said sender or a target sending rate for said sender. A target sending rate can e.g. be announced by an application that is sending video information and intends to send at a certain quality.

The controller 10 and buffer 20 shown in FIG. 1 will generally be provided within a network node of communication network 3. Such a communication node can e.g. be a server and/or a router in network 3.

If a flow control parameter is extracted from the above mentioned acknowledgement data units, then this can be done at the network node in which the controller 10 and buffer 20 are provided, or it can be done at a different network node, in which latter case the extracted flow control parameter is sent from said other network node to the network node in which the controller 10 and buffer 20 are provided.

FIG. 1 shows an example of the former case, where it is additionally assumed that the buffer 20 also holds the acknowledgment data units, such that the flow control parameter determinator 105 can extract the desired flow control parameter from the buffered acknowledgment data units.

It is generally preferred that the extraction of the flow control parameter occur in the node in which the buffer and buffer controller are provided. However, it is possible that the network is arranged in such a way that this is very difficult or impossible, e.g. due to the data units being handled by the buffer having higher layer data units embedded within themselves, and an additional encryption having been performed in the embedded higher layer data units, such that any control parameter contained within said higher layer data units can not be extracted. It is noted that the term "embedding" means encapsulation and/or segmentation.

In such a case, where the extraction is not feasible at the network node at which the controller and buffer are provided, a procedure should be implemented such that a different network node, at which the embedded higher layer data units are decipherable, performs the extraction of the desired flow control parameter, and sends the extracted flow control parameter to the network node in question. The sending can be performed by a dedicated connection, or by providing a dedicated location within data units sent from the other network node to the network node in question.

In the latter case, the flow control parameter determinator 105 is itself connected to network 3, in order to receive the extracted flow control parameter (not shown in FIG. 1).

Now, further embodiments will be described with reference to FIGS. 3 and 4. It is noted that the same reference numerals as contained in FIGS. 1 and 2 relate to corresponding elements in FIGS. 3 and 4, such that a repeated description is not necessary.

Figure 3:
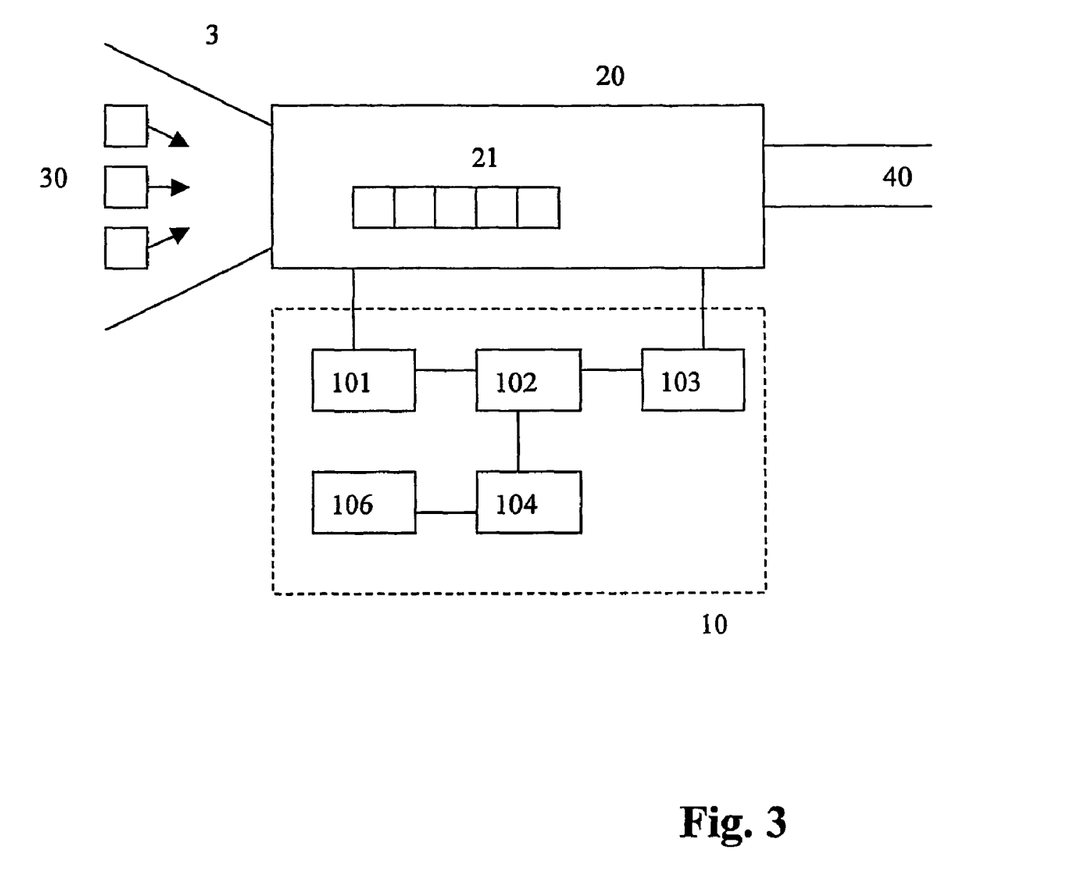
FIG. 3 shows a schematic block diagram representation of a buffer and buffer controller according to another embodiment of the invention.
Figure 4:
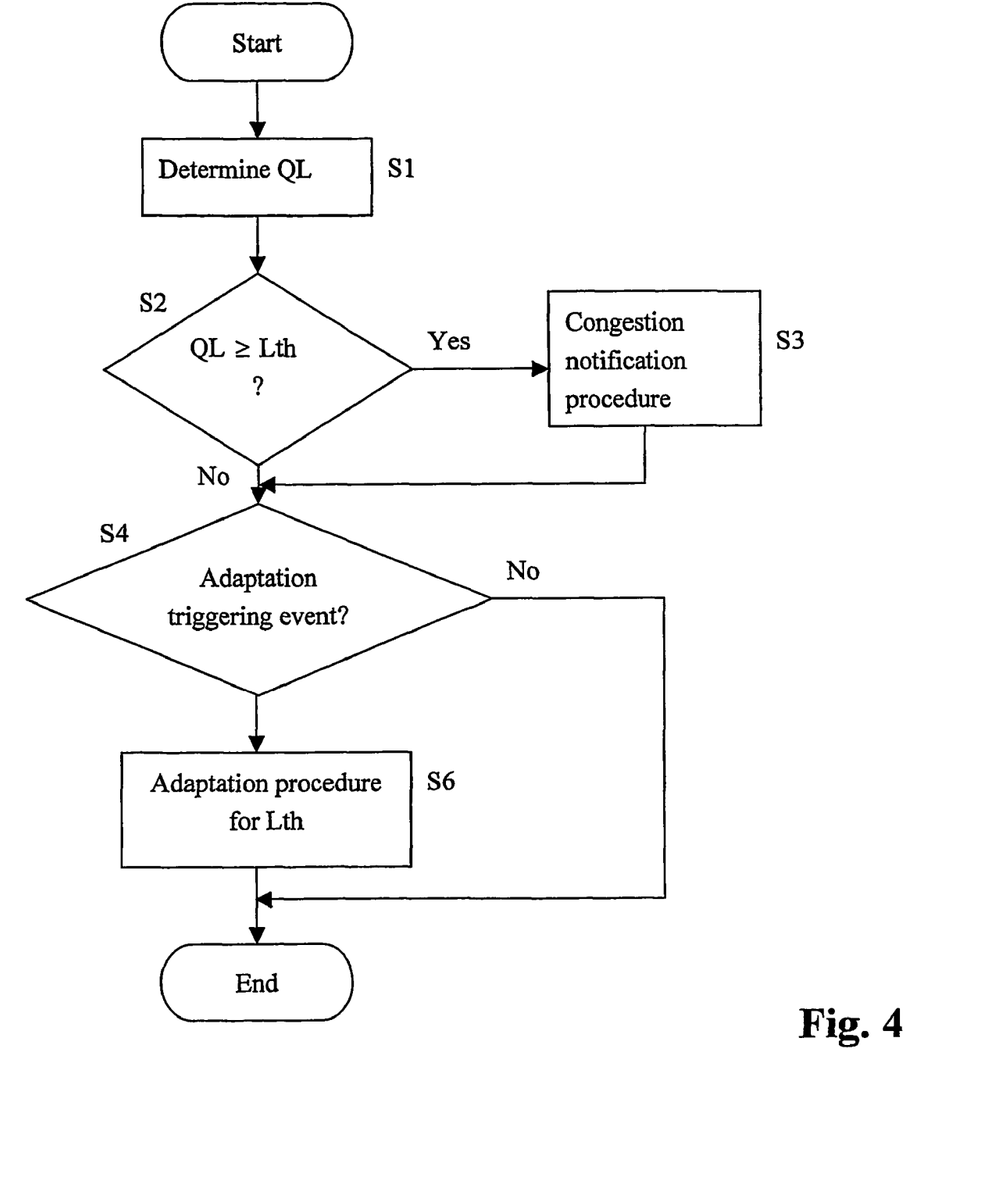
FIG. 4 shows a flow chart of another method embodiment of the present invention.

The arrangement shown in FIG. 3 is almost the same as that shown in FIG. 1, except that the flow control parameter determinator 105 has been replaced by a storage device 106 for storing one or more predetermined values that are based upon flow control parameters used by known flow control procedures. FIG. 4 shows a flow chart that is identical to that of FIG. 2, except that step S5 has been omitted, and the adaptation procedure for $L_{th}$ in S6 is arranged to take the one or more values stored in storage device 106 into account when adapting $L_{th}$.

Parameters used in flow control procedures can e.g. be known from the fact that certain computer programs that contain flow control routines consistently use one or more specific flow control parameters. It is then not necessary to obtain such parameters from data units or acknowledgement messages. As an example, the well known operating system Windows 2000 of Microsoft Corporation specifies specific values for the calculation of the TCP receive window, i.e. the window that a TCP receiver advertises to the TCP sender. These values are based on 16 KB or 64 KB. The exact value used in an initial condition is 16384 bytes, and for Ethernet the window is normally set to 17520 bytes (16 KB rounded up to twelve 1460-byte segments, see Microsoft Windows 2000 TCP/IP Implementation Details, White Paper, by Dave MacDonald and Warren Barkley, 2000, pages 31 and 32. As a consequence, the values 16 KB and 64 KB (and possibly 16384 bytes and/or 17520 bytes) can be stored as predetermined flow control values.

It is noted that the embodiments shown in FIGS. 1 and 3 can be combined, i.e. in the form of an embodiment that makes use of both predetermined stored flow control parameters as well as flow control parameters introduced by the sender and/or receiver and obtained from data units or acknowledgment messages.

As already mentioned above, the automatic threshold adaptation procedure can be arranged in any suitable or desirable way. Preferably, it is arranged in such a way that it comprises estimating a link capacity value LC, analysing whether the performance of a congestion notification procedure will lead to an under-utilization of this estimated link capacity due to a reaction of the sender to the congestion notification, under the condition that the length threshold value is set equal to the estimated link capacity value, and adapting the length threshold value on the basis of a result of the analysing step, by setting the link threshold value equal to the estimated link capacity value if the analysing step indicates no under-utilization, and setting the length threshold value larger than the estimated link capacity value otherwise.

The link capacity value can be understood as the minimal amount of data that the sender of the flow under consideration must send out, such that the bandwidth that link 40 allocates to said flow is fully used. Full utilization means that the proportion of link bandwidth allocated to the given flow is always in full use. Expressed somewhat differently, if one considers the simplified example of link 40 only serving a single flow, then this means that the sender of that flow sends so much data that link 40 is constantly busy, i.e. constantly sending data units, without any idle time in between. Again in other words, the link capacity is the amount of data that the sender brings into flight, such that any additional data brought into flight will not increase throughput, as the additional data is queued.

The link capacity can also be understood as the product of the data rate provided by the link 40 to the flow in question, multiplied by the round trip time (RTT) associated with said flow for the case of an unloaded network. An unloaded network means that there is no queuing delay. As a consequence, the value of the unloaded RTT is equal to the difference between the actual RTT of the flow and all queuing delays for said flow.

The estimation of the link capacity value will therefore generally consist in determining a time value indicative of the unloaded RTT, and multiplying this value with the data rate DR provided by link 40 for the flow in question. The determination of this unloaded RTT can be done in any suitable or desirable way. One example is to calculate the sum of a constant $RTT_{WC}$ and the RTT provided by link 40. $RTT_{WC}$ is a worst-case estimation of the overall unloaded RTT excluding the RTT of the link 40 in question, and may have a value of 150 to 300 ms, more preferably 150 to 250 ms. An alternative possibility of estimating the unloaded RTT for the given flow consists in calculating the queuing delay at buffer 20, e.g. by keeping an average of the amount of time that a buffered data unit 30 spends in queue 21, and calculating the difference between the actual RTT of the flow and this queuing delay. The value of the actual RTT for the flow can e.g. be inserted into the data units of said flow by the sender and read by controller 10.

It is noted that the estimate LC of the link capacity will generally not be identical to the actual momentary link capacity. The process of estimating the link capacity is preferably such that the estimated value exceeds the real link capacity, i.e. the estimate is conservative. This can be achieved in any suitable or desirable way, e.g. by using the above mentioned worst case estimates for the unloaded RTT, and/or by adding predetermined positive factors to one or more of the parameters used in estimating the link capacity. In other words, one can add a predetermined factor to the unloaded RTT and/or to the RTT of the link and/or to DR, and one can add a predetermined positive factor to the calculation result, i.e. replacing the calculated value of LC by LC+ε: LC←LC+ε.

The step of analysing whether the performance of a congestion notification procedure will lead to under-utilization of the estimated link capacity will depend on the specific type of flow control used for the flow under consideration. Specific examples will be given further on. In any case, if, under the condition that the length threshold value is considered to be set equal to the estimated link capacity value, no under-utilization is expected due to the flow control reaction of the sender to the congestion notification, then the actual length threshold value can be set to this estimated link capacity. On the other hand, if the analysis indicates under-utilization, i.e. a situation where one or more idle periods of the bandwidth allocated to the particular flow can be expected, then the length threshold value $L_{th}$ is set larger than the estimated link capacity value. In doing so, the tendency to perform a congestion notification procedure is reduced, as the probability of exceeding the length threshold value $L_{th}$ is decreased. As a consequence, the probability of a link under-utilization is also decreased. Therefore, the link resources are less likely to be wasted due to under-utilization.

Preferably, the length threshold value $L_{th}$ is set to a value derived on the basis of the flow control parameter, if the analysing step indicates under-utilization.

This shall be explained in the context of an example, where the flow control between sender and receiver is window-based. More specifically, the sender is arranged to send data units in a predetermined sequence and the receiver is arranged to send acknowledgment messages for acknowledging the correct receipt of the data units. Each acknowledgment message identifies the last data unit correctly received in the sequence, and the receiver sends to the sender a window value that expresses a limitation of how many data units the receiver can handle. The sender of the flow performs window-based flow control using a send window that is selected as the minimum of the window advertised by the receiver and a second window value, such that the sender must not send data units with a sequence number higher than the sum of the highest acknowledged sequence number and the send window. As a reaction to a congestion notification, the sender divides the second window value by k, k>1, and thereafter increases the second window by a predetermined increment for each duplicate acknowledgment message it receives. A duplicate acknowledgment message is an acknowledgment data unit that identifies the correct receipt of a sequence number that has already been acknowledged in a previous acknowledgment data unit.

An example of a system working this way is TCP, where the advertised window is also referred to as rwnd, the above mentioned second window is the congestion window and the process of reacting to a congestion notification is known as fast recovery. For TCP, k=2. However, it is noted that the present embodiment is not restricted to TCP, and can be applied to any system that operates as generically described above.

In accordance with this embodiment, the flow control parameter used for buffer management is the first window value contained in the acknowledgment data units, i.e. the window value that expresses a limitation of how many data units the receiver can handle. Furthermore, the length threshold value $L_{th}$ is initially (i.e. when starting to manage the data units of the flow in question) set to the above described estimated link capacity value LC. Then, the automatic threshold adaptation procedure S6 is performed in such a way that the length threshold value $L_{th}$ is set equal to the estimated link capacity value LC if the first window value (e.g. rwnd) is greater than $(L_{th}+2 \times LC)$, which is initially equal to three times the estimated link capacity value LC.

The reason for this will be explained in the following. In a flow control system that operates as described above, if the queue length threshold $L_{th}$ is set to the estimated link capacity value LC, then the send window size at the time of a congestion notification procedure will be $L_{th}+LC=2 \times LC$. This is due to the fact that if the send window size is equal to the link capacity, then the queue length will be zero. Furthermore, in order to utilize the link during the phase of congestion notification response (i.e. when the second window value is divided by two and is incremented by a predetermined increment for each duplicate acknowledgment message thereafter), this second window needs to be able to inflate to 1.5 times the send window size at the time of the congestion notification procedure. As a consequence, if the send window is unable to inflate beyond $2 \times 1.5 \times LC$, the congestion notification will lead to a link under-utilization. Therefore, the step of comparing the window advertised by the receiver with $3 \times LC$ is an example of a step for analysing whether a link under-utilization will occur in response to a congestion notification.

When generalizing the above considerations, it may be taken into account that $L_{th}$ could change and no longer be equal to LC, such that the condition is to compare the advertised window with $(L_{th}+LC) \times 1.5$.

Using TCP as an example, this embodiment can also be expressed in pseudo-code:

```
If (rwnd > 1.5 × (LC+ Lth) {
  Lth = LC;
} else {
  Lth = X;
}
```

It is noted that in the above example the length threshold $L_{th}$ is set equal to the estimated link capacity LC if rwnd is greater than $1.5 \times (LC+Lth)$. However, it is also possible to set $L_{th}=LC$ if $rwnd=1.5 \times (LC+Lth)$.

The value of X can be chosen in any suitable of desirable way, as long as it is larger than LC. For example, it can be chosen as a function of the first window value (rwnd in the example). Preferably, it is set equal to the first window value minus a predetermined reduction value, where said predetermined reduction value may be zero or may be itself a function of the maximum segment size of the data units of the flow. For example, the predetermined reduction value can be two times the maximum segment size.

The benefit of setting the length threshold value in dependence on the window value advertised by the receiver of the flow is that the length threshold value will not be reached if the flow is limited by the receiver. If the length threshold value is not reached, no congestion notification procedure is conducted, and consequently no link under-utilization is unnecessarily provoked. As a consequence, a better utilization of link resources is achieved while at the same time not negatively affecting the flow control perform at the sender and receiver.

Now a further TCP example will be described that is based upon an arrangement and method as explained in connection with FIGS. 3 and 4. It is assumed that two known receiver window values are stored, referred to as LIM1 and LIM2. LIM1 is larger than LIM2. For example, LIM1=64 KB and LIM2=16 KB, see above example described in connection with the operating system Windows 2000. Naturally, LIM1 can also be a value chosen on the basis of 64 KB, e.g. any value in a given range around 64 KB, and equally LIM2 can also be a value chosen on the basis of 16 KB, e.g. any value in a given range around 16 KB. Expressed in pseudo-code:

```
If 1.5 ×(LC+ Lth) > LIM1 {
  Lth = X1;
} else if 1.5 × (LC+ Lth) > LIM2 {
  Lth = X2;
} else {
  Lth = LC
}
```

X1 is larger than X2, and both are larger than LC. Preferably, X1 is a function of LIM1 and/or X2 is a function of LIM2. For example, the function can be the value of LIM1 or LIM2 minus a predetermined reduction value, where said predetermined reduction value may be zero or may be itself a function of the maximum segment size of the data units of the flow. For example, the predetermined reduction value can be two times the maximum segment size.

Although the present invention has been described by way of specific examples, these are not intended to be limiting, as the scope of the invention is defined by the appended claims. Reference signs in the claims only serve to make the claims easier to read and are also not intended to have any limiting effect.

The invention claimed is:

1. A method implemented by a network node for controlling a queue buffer, the queue buffer being connected to a link and being arranged to queue data units of a flow in a queue, comprising the steps of:
   determining a value of a length parameter related to the length of the queue;
   comparing the value with a length threshold value;
   performing a congestion notification procedure if the value is greater than the length threshold value, wherein the congestion notification procedure when performed drops or marks one or more data units;
   performing an automatic threshold adaptation procedure, wherein the automatic threshold adaptation procedure comprises a procedure for adjusting the length threshold value on the basis of one or more flow control parameters, wherein the automatic threshold adaptation procedure determines when the congestion notification procedure would be performed to drop or mark one or more of the data units; and
   determining, in a procedure, one or more of the one or more flow control parameters from a flow control parameter introduced by one of a sender and a receiver of the flow queued in the queue;
   introducing the flow control parameter by the receiver and inserting it into data units sent from the receiver to the sender; and
   wherein the buffer is provided in a network node of a communication network connecting the sender and the receiver, further comprising the step of extracting, in a procedure for determining the flow control parameter, the flow control parameter from the data units at the network node.

2. The method of claim 1, wherein the one or more flow control parameters are predetermined values.

3. The method of claim 1, wherein the data units sent from the receiver to the sender are acknowledgment data units so as to acknowledge the correct receipt of data units.

4. The method of claim 3, wherein the buffer is provided in a first network node of a communication network connecting the sender and the receiver, further comprising the steps of:
    extracting, in a procedure for determining the flow control parameter, the flow control parameter from the acknowledgement data units at a second network node different from the first network node; and
    sending the flow control parameter from the second network node to the first network node.

5. The method of claim 1, further comprising performing a rate-based flow control for the flow in the queue, wherein one of the one or more flow control parameters is a control rate.

6. The method of claim 5, wherein the control rate is introduced by the receiver and expresses a data rate limitation for arriving data units that the receiver can handle.

7. The method of claim 1, as implemented in a computer program product arranged to execute the method on a programmable data processing device connected to a communication network containing the link.

8. A network node including a queue buffer controller for controlling a queue buffer coupled to a link and arranged to queue data units of a flow in a queue, comprising:
    a queue length determinator for determining a value of a length parameter related to the length of the queue, a comparator for comparing the value with a length threshold value;
    a congestion notifier for performing a congestion notification procedure if the value is greater than the length threshold value, wherein the congestion notification procedure when performed drops or marks one or more data units;
    a threshold adaptor for automatically adapting the length threshold value, wherein the threshold adaptor is arranged for adjusting the length threshold value on the basis of one or more flow control parameters, wherein the automatic threshold adaptation procedure determines when the congestion notification procedure would be performed to drop or mark one or more of the data units; and
    a flow control parameter determinator for determining one or more of the one or more flow control parameters from a flow control parameter introduced by one of a sender and a receiver of the flow queued in the queue;
    the flow control parameter being introduced by the receiver and inserted into data units sent from the receiver to the sender; and
    the queue buffer being provided in a network node of a communication network connecting the sender and the receiver, wherein the flow control parameter determinator is arranged for extracting the flow control parameter from the data units at the network node.

9. The network node of claim 8, wherein the one or more flow control parameters are predetermined values.

10. The network node of claim 9, wherein the predetermined values are stored in the queue buffer controller and associated with known flow control procedures for data unit receivers.

11. The network node of claim 8, wherein the data units sent from the receiver to the sender are acknowledgment data units so as to acknowledge the correct receipt of data units.

12. The network node of claim 11, wherein the flow control parameter is introduced by the receiver and inserted into acknowledgment data units sent from the receiver to the sender for acknowledging the correct receipt of data units, and wherein the queue buffer is provided in a first network node of a communication network connecting the sender and the receiver, wherein the flow control parameter determinator is arranged for receiving the flow control parameter from a second network node at which the flow control parameter was extracted.

* * * * *